(12) United States Patent
Leroy et al.

(10) Patent No.: US 7,990,847 B1
(45) Date of Patent: Aug. 2, 2011

(54) METHOD AND SYSTEM FOR MANAGING SERVERS IN A SERVER CLUSTER

(75) Inventors: David James Leroy, Sunnyvale, CA (US); Wesley Chou, Sunnyvale, CA (US); Anurag Kahol, Fremont, CA (US); Anh Tien Nguyen, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 11/106,801

(22) Filed: Apr. 15, 2005

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............... 370/216; 709/227; 714/4; 714/5; 718/105

(58) Field of Classification Search ............... 370/218, 370/219, 220; 709/227; 714/4, 5; 718/105
See application file for complete search history.

(56) References Cited

U.S. PATENT DOCUMENTS

| 5,959,969 | A  | * | 9/1999  | Croslin et al. ............... 370/216 |
| 6,779,039 | B1 |   | 8/2004  | Bommareddy et al. |
| 6,859,882 | B2 |   | 2/2005  | Fung |
| 6,880,089 | B1 |   | 4/2005  | Bommareddy et al. |
| 2003/0131005 | A1 | * | 7/2003  | Berry .............................. 707/10 |
| 2004/0131059 | A1 | * | 7/2004  | Ayyakad et al. ............... 370/389 |
| 2004/0133634 | A1 |   | 7/2004  | Luke et al. |
| 2004/0268176 | A1 | * | 12/2004 | Greenlee et al. .................. 714/4 |
| 2005/0120259 | A1 | * | 6/2005  | Aoki .................................. 714/5 |
| 2006/0029016 | A1 | * | 2/2006  | Peles ............................. 370/328 |
| 2006/0053330 | A1 | * | 3/2006  | Pomaranski et al. ............. 714/1 |
| 2006/0215588 | A1 | * | 9/2006  | Yoon ............................. 370/310 |

OTHER PUBLICATIONS

Product Bulletin No. 1773, Cisco Content Switching Module: Software Version 2.2(1), Cisco Systems, Inc., Jun. 4, 2004, pp. 1-3.

* cited by examiner

*Primary Examiner* — Daniel J Ryman
*Assistant Examiner* — Jae Y Lee
(74) *Attorney, Agent, or Firm* — Hickman Palermo Truong & Becker LLP

(57) ABSTRACT

A method of managing servers in a server cluster is disclosed. The health of servers is detected through passive return traffic monitoring. Server failure can be detected through TCP information or HTTP return codes. Various settings affecting number of failure thresholds and the time period to detect failures can be configured. Servers can be mapped to URLs such that passive health monitoring can be performed for URLs instead of server clusters.

20 Claims, 7 Drawing Sheets

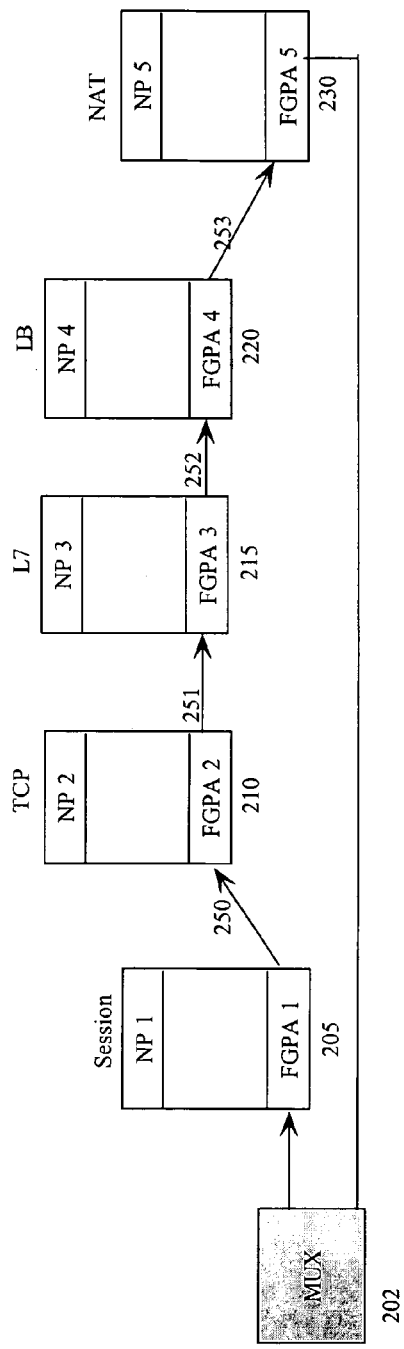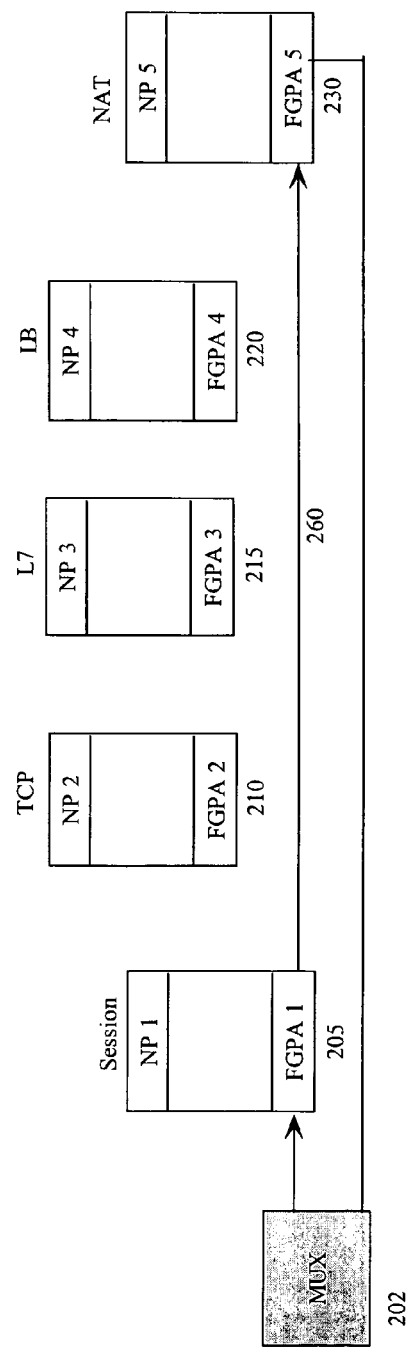

METHOD AND SYSTEM FOR MANAGING SERVERS IN A SERVER CLUSTER

FIELD OF THE INVENTION

The present invention generally relates to computer network management. The invention relates more specifically to methods for monitoring server health through passive response snooping in a load balancing switch.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a client-server environment, clients send requests for services and information to servers located on a network. The servers are often grouped into clusters so that large numbers of clients can access data and services without overloading any single server. Server load balancers are placed between the clients and servers, such that a load balancer receives requests from clients and distributes the requests across a server cluster.

The network shown in FIG. 1 illustrates such an environment. In FIG. 1, Server Load Balancer (SLB) 140 accepts requests sent from clients 162, 164, 166, through network 150, to a "virtual server." The term "virtual server" is used to describe the Internet Protocol (IP) address to which a client connects in order to access resources and services from a server cluster. A virtual server is a single server instance that acts as a middleman between clients and the actual physical servers in the server cluster represented by the virtual server.

In FIG. 1, server cluster 110 includes a group of "real servers" 112, 114, 116, 118. Real servers are the physical devices that provide the services. The addition of new real servers and the removal or failure of existing real servers in the server cluster can occur at any time without affecting the availability of the virtual server.

SLB 140 selects a particular real server in server cluster 110 for processing a request. Typically, when a client 162, 164 or 166 initiates a connection to the virtual server representing server cluster 110, SLB 140 chooses a real server 112, 114, 116 or 118 for the connection based on a load balancing algorithm.

"Load balancing" refers to techniques used to distribute incoming service requests evenly among multiple servers such that the load distribution is transparent to users. Various load balancing algorithms and techniques can be used to determine which specific server should handle which client requests. As is known to those skilled in the art, there are many types of load balancing algorithms that can direct traffic to individual servers in a server cluster. For example, a round robin, weighted round robin, or weighted least connections algorithm may be used.

There are many factors that can be considered by a load balancing algorithm when selecting a real server to process a request. In particular, the "health" of a server can be considered as a factor in the load balancing analysis. For example, if a server is known to be currently unresponsive, it may be taken out of consideration as an available server in the load balancing analysis and subsequent real server selection. To determine the health of a server, out-of-band probes that attempt to connect to specific protocol destination ports have been used. The response (or lack of response) from these probes can be used to determine if the server is healthy or not. For example, an Internet Control Message Protocol (ICMP) probe may be made to determine if a server is responding normally.

Feedback tests, such as out-of-band health probes, can be proactively initiated. These types of probes may be configured to run at specific intervals, for example. If a probe does not receive a response from a server, or receives an abnormal response, the server is considered failed, and can be removed from the server cluster and from load balancing consideration.

Although configuration of a small number of out-of-band probes should have minimal impact on the performance of the system, such probes do not scale well. If the processor handling the probes is already running close to maximum capacity, a linear increase in the number of probes could lead to a greater than linear increase in processing burden. In addition, out-of-band probes are also limited by the fact that the speed in which they can detect failure is bounded by the probe frequency.

Therefore, there is a need for alternative techniques for monitoring server health that do not rely on out-of-band probes, and do not increase the processing burden on a server cluster.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram of the connection pipeline of FIG. 2;

FIG. 3B is block diagram of the forwarding pipeline of FIG. 2;

DETAILED DESCRIPTION

Figure 1:
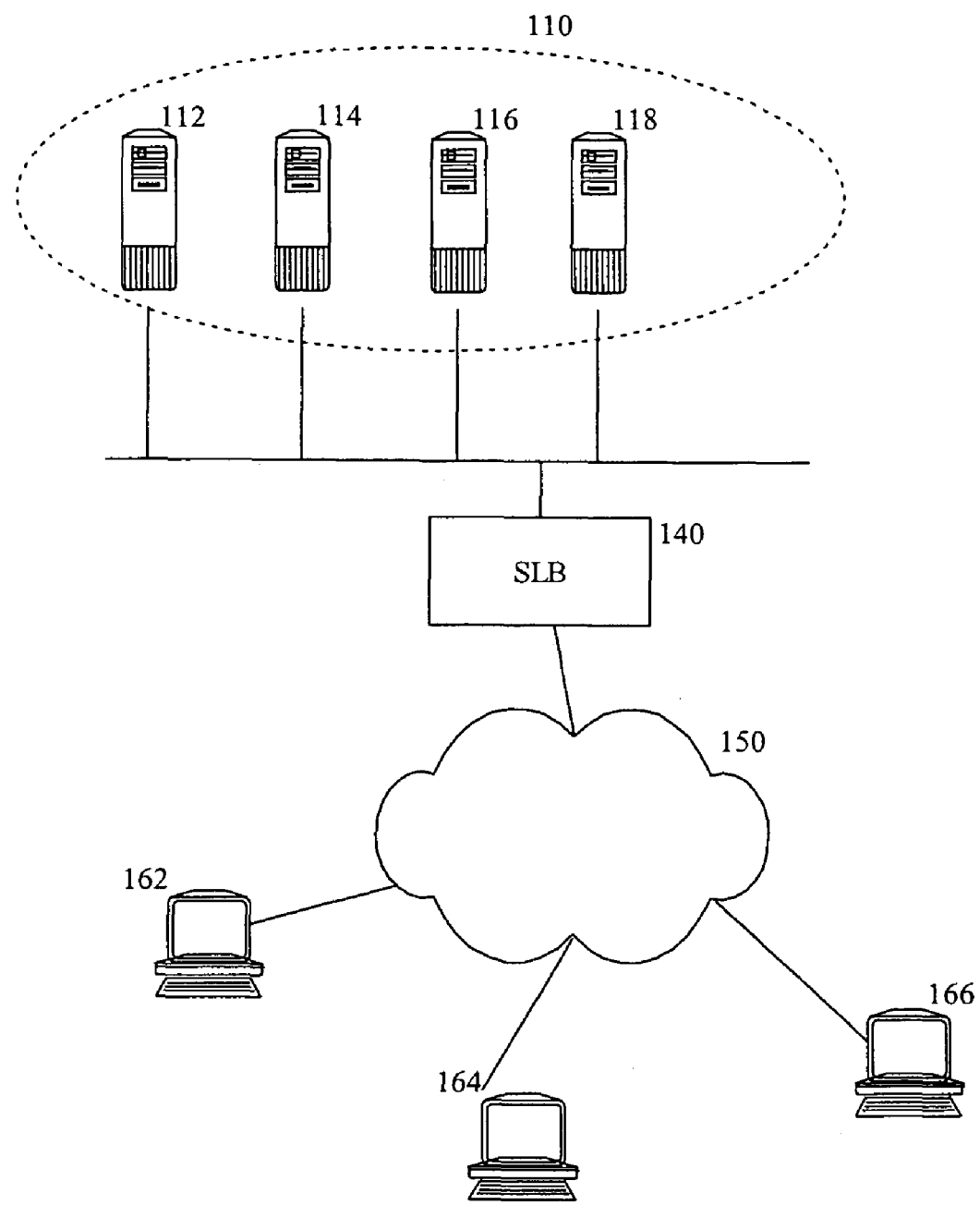
FIG. 1 is a block diagram of a network arrangement in which a Server Load Balancer is used to route requests from clients to particular real servers in a server cluster.

A method and system for managing servers in a server cluster is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural And Functional Overview
   2.1 Server Load Balancing Overview
   2.2 Content Switch Overview 2.2.1 Pipelined Architecture for a Content Switch
2.3 Passive Server Health Monitoring
 2.3.1 Intelligent Detection of Server Failure
 2.3.2 Sliding Time Window For Determining Server Health
 2.3.3 Intermediate Error States
 2.3.4 HTTP Return Code Parsing
3.0 Implementation Mechanisms—Hardware Overview
4.0 Extensions and Alternatives
1.0 General Overview The needs identified in the foregoing Background, and other needs and objects that will become apparent for the following description, are achieved in the present invention, which comprises, in one aspect, a method for managing servers in a server cluster comprising the machine-implemented steps of receiving response traffic from a server in the server cluster; detecting an abnormal end session in the response traffic; starting a time clock at a first start time, said first start time corresponding to a time the abnormal end session was detected; initializing a failure count; receiving further response traffic from the server; for each additional abnormal end session detected in the further response traffic, then performing the steps of updating the failure count; and if the failure count exceeds a configured failure threshold, taking the server out of the server cluster; if the configured time limit is reached and the server is still in the server cluster, then performing the steps of adjusting the failure count; and restarting the time clock at a second start time, said second start time corresponding to a time a first abnormal end session was detected in the further response traffic.

In another aspect, a method of managing servers in a server cluster comprises the machine-implemented steps of receiving response traffic from a server in the server cluster; detecting, within a configured retry time period, a number of abnormal end sessions in the response traffic that exceeds a first configured failure threshold; changing a state of the server to a first state that indicates that the server is at least temporarily removed from the server cluster, and starting a first state time clock; when the first state time clock expires, changing the state of the server to a second state that indicates that the server is included in the server cluster; receiving further response traffic from a server in the server cluster; detecting, within the configured retry time period, a number of abnormal end sessions in the further response traffic that exceed a second configured failure threshold, and changing the state of the server to a third state that indicates that the server is removed from the server cluster; wherein said second configured failure threshold is less than said first configured failure threshold.

In another aspect, a method of managing servers in a server cluster comprises the machine-implemented steps of mapping a URL to at least one server in a server cluster; receiving response traffic from a server in the server cluster; detecting a HTTP return code in the response traffic matching a HTTP return code that has been configured as a failure return code; if the server is mapped to the URL, determining if the response traffic matching the failure return code is associated with the URL; if the response traffic is associated with the URL, then determining whether to remove the server according to policies configured for the URL; and if the response traffic is not associated with the URL, then determining whether to remove the server according to policies configured for the server cluster.

In another aspect, a method of managing servers in a server cluster comprises the machine-implemented steps of mapping a URL to at least one server in a server cluster; receiving response traffic from a server in the server cluster; detecting a HTTP return code in the response traffic matching a HTTP return code that has been configured as a failure return code; if the server is mapped to the URL, removing the server from the server cluster for traffic requesting that URL and leaving the server in the server cluster for traffic that does not request the URL.

In other aspects, the invention encompasses a computer apparatus and a computer-readable medium configured to carry out the foregoing steps.

2.0 Structural and Functional Overview

In one embodiment, a method and system for monitoring server health passively monitors in-band connections in order to immediately detect any failures or anomalies in the response of servers or other devices. By simply "snooping" traffic as it returns through the system, it can be quickly determined whether a server needs to be removed from a server cluster. The disclosed approach does not require any out-of-band probes, and therefore does not impose additional test traffic on the servers. The techniques disclosed herein can deduce whether a server is healthy by passively monitoring traffic returned from that server.

2.1 Server Load Balancing Overview

FIG. 1 illustrates a basic network configuration in which requests to a virtual server are routed to a real server in a server cluster. In the example network shown in FIG. 1, SLB 140 accepts requests from clients 162, 164, 166 directed to a virtual server representing server cluster 110, and sends the requests to particular real servers 112, 114, 116, 118 in the server cluster based on load balancing techniques. For example, in the network configuration of FIG. 1, a packet directed to a particular virtual IP address (VIP) may be received by SLB 140, and routed by SLB 140 to real server 112, based on a load balancing algorithm that determines that real server 112 is the best server to process this packet. Clients typically only have virtual server connection information, and do not have knowledge of the IP addresses of the real servers.

SLB 140 uses a load balancing algorithm to select a real server for processing a request from a client. Various load balancing algorithms have been developed and are known to those skilled in the art. Examples of known load balancing algorithms include Round Robin, Weighted Round Robin, Least Connections, Weighted Least Connections, IP Address Hashing or Uniform Resource Locator (URL) Hashing. Typically, load balancing algorithms are designed to select an appropriate server in an efficient manner, such that the request response time is not affected. Any load balancing algorithm may be used with the techniques disclosed herein to passively monitor the health of a server, as the disclosed techniques are not dependent on a SLB using any particular load balancing algorithm.

SLB 140 is represented in FIG. 1 as a separate device, however, Server Load Balancing capability is typically a combination of hardware and software that can sit in a router or switch. Server Load Balancing functions may also be implemented in a separate independent software module that can be installed on any device. "Server Load Balancer" (SLB) is used herein to indicate any type of device with Server Load Balancing capabilities, whether implemented in hardware, software or both. A SLB, as used herein, can indicate an independent device solely dedicated to performing Server Load Balancing functions, or a device that performs Server Load Balancing functions in addition to other services. In general, client requests can be directed to the IP address of any device that has Server Load Balancing capability (i.e. the SLB).

While FIG. 1 illustrates a SLB used to balance traffic from clients to servers, a switch or router that has Server Load Balancing capabilities can also be used to switch or manage traffic to many types of devices, such as firewalls, Secure Sockets Layer (SSL) devices, Web servers, and Lightweight Directory Access Protocol (LDAP) servers. In general, a SLB switch can be used to ensure that no single device, or set of devices, gets overwhelmed with requests for resources.

In certain embodiments, SLB 140 also receives replies from real servers and forwards them to the appropriate requesting client. There are various techniques available for a SLB to determine the client to which return traffic should be routed. For example, in certain network configurations, the virtual server IP address is configured as a loopback address, or secondary IP address, on each of the real servers, so that the SLB can forward requests and replies on behalf of both parties. In addition, active sessions may be tracked by the SLB in a session table. For example, when a first packet arrives from a client, a SLB switch may record the source and destination IP address and ports in the session table, select a server based on load balancing techniques, and use Network Address Translation (NAT) techniques to route the packet to the selected real server. When the reply from the selected real server is received by the SLB switch, it can be determined from the session table which client should receive the reply.

The load balancing algorithm used by a SLB can take into account many various combinations of attributes relating to the network, the user, or the servers in making the real server selection. In many situations, load balancing using basic information about the clients and the requested services may be sufficient. However, in order to provide more intelligent traffic routing, a SLB can make load balancing determinations based on the contents of a packet. In particular, SLBs may use packet header Open System Interconnection (OSI) protocol data in the load balancing analysis. For example, OSI Layer 4 packet information, such as Transmission Control Protocol (TCP) and User Datagram Protocol (UDP) information, can be used to direct traffic based at least in part on port, source and/or destination IP address.

A SLB that uses the actual content of the packets themselves in the load balancing analysis is sometimes called a "content switch." Content switches are especially useful in the context of managing Internet traffic, specifically web traffic. Content switches typically perform load balancing and intelligent routing based on Layer 4 through Layer 7 packet information. Specifically, content switches typically load balance client requests based on Layer 4 TCP port information and/or Layer 7 Hypertext Transfer Protocol (HTTP) information (such as a specific URL) in the client request.

The techniques for passively monitoring the health of a server disclosed herein are particularly useful to a content switch that uses Layer 4 to Layer 7 information to load balance or manage traffic to web servers. However, the disclosed techniques can be used by any SLB, and a content switch that load balances web servers is not required for implementing the disclosed techniques.

2.2 Content Switch Overview

Internet traffic, and specifically web traffic, has unique networking requirements. In order to manage web traffic, content switches are typically installed in data centers between an Internet access router and web server clusters.

A content switch intelligently balances the traffic load across web servers based on server load and content availability. Content switches route messages by inspecting the contents of the messages, and forwarding messages to specific servers based on policies that meet the requirements of the server and/or application. Content switches may also monitor the health of each of the servers and provide automatic failover by routing messages to another appropriate server when a first server fails. Typically, a content switch monitors every active connection, and may keep track of current status for each connection in a table of active sessions. Significantly, the session table can also be used to determine which real server is associated with a particular session, and to route reply packets back from a real server to the requesting client.

The primary role of content switches is to route messages to and from specific servers based upon the requirements of the application as well as the servers themselves. These application and device requirements are expressed in terms of "policies" that are configured on the content switch. A policy generally refers to a set of rules or configurable controls that govern the operation of a content switch. For instance, when routing messages to a group of application servers, one might be concerned with balancing the load across the application servers, while ensuring that all connections from a particular client are routed to the same point-of-contact application server until a particular transaction or set of transactions is complete (i.e. providing connections with persistence).

Typically, a content switch will include rules for persistence and failover requirements in addition to basic load balancing requirements. In general, the set of policies implemented by a content switch may include (1) load balancing policies (i.e. which load balancing algorithm to use, which servers are available to handle certain types of requests, etc.); (2) persistence policies; (3) failover policies; (4) content-specific policies (i.e. specifying different treatments for different content, e.g. partition a server cluster into static and dynamic sections); and (5) device-specific policies (i.e. specifying different treatment for different types of devices, e.g. wireless clients go to a different set of servers). New requests that arrive at a content switch are first classified to determine whether matching policies exist, and then processed according to the actions specified by those policies.

A policy may include OSI Layer 3 and Layer 4 information (IP address, protocol, and port). A policy may also incorporate Layer 7 information. For example, HTTP header information may be incorporated into a content switch policy.

The content switch can be configured to use Network Address Translation (NAT) to modify the address information in the client's request before sending the request to a real server, and in the real server's response before sending the response back to the client. Significantly, a content switch can be configured such that all real server response traffic is returned through the content switch instead of being returned directly to the requesting client.

Techniques for server health monitoring disclosed herein can determine the "health" of a server based on information deduced when passively monitoring traffic returned to the content switch from the server. A content switch is a type of SLB that is well suited for the disclosed techniques as a content switch monitors every active connection. However, while approaches are described herein using a content switch as an example SLB, the disclosed techniques can be used by any type of server or load balancer device in which return traffic can be passively monitored, and are not limited to content switches.

2.2.1 Pipelined Architecture for a Content Switch

Figure 2:
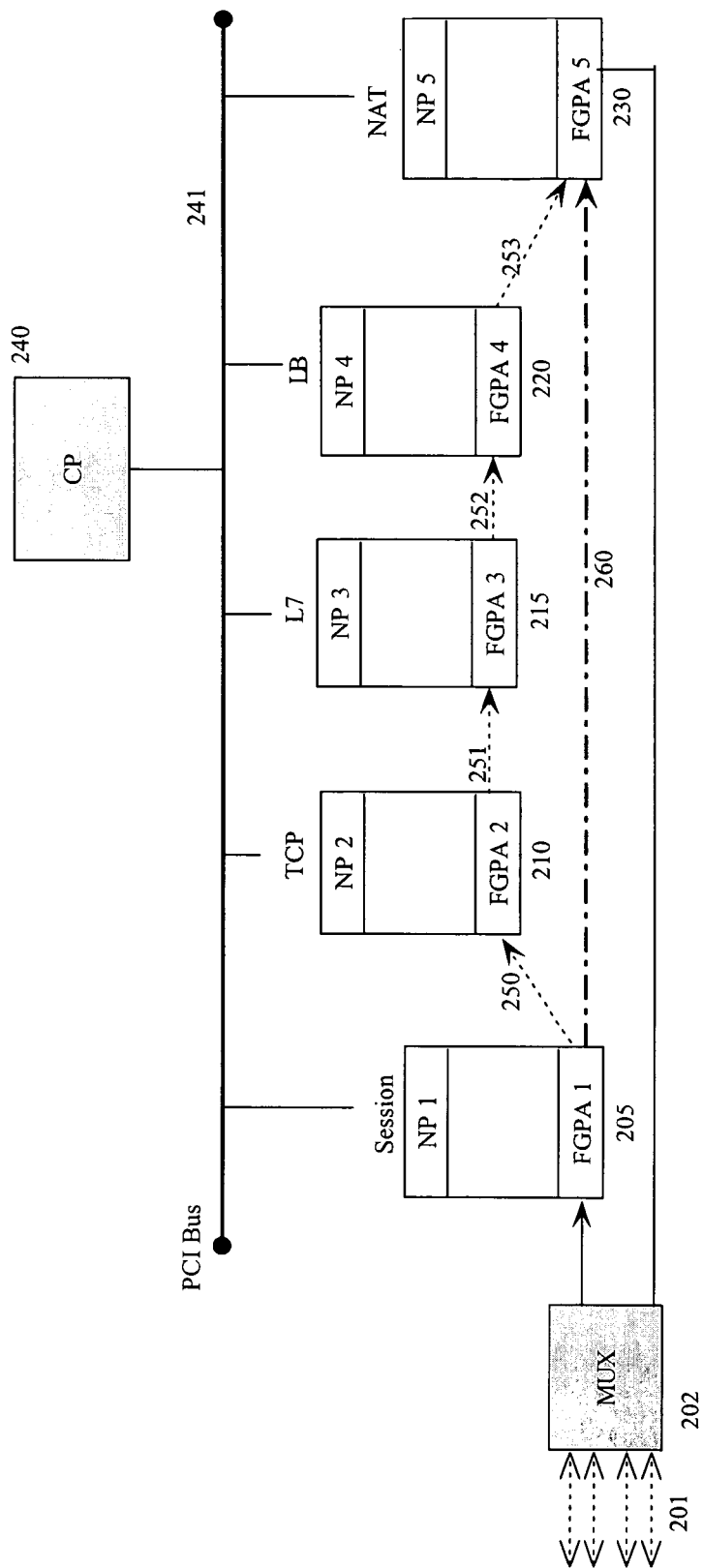
FIG. 2 is a block diagram of a pipelined architecture for a Content Switch.

Load balancing based on policies that user Layer 7 HTTP information requires the content switch to perform considerable processing for each received packet. In addition, when a content switch is configured such that all response traffic is sent through the content switch, the amount of packet processing is also increased. The addition to the packet processing overhead and CPU resources on the content switch can be significant. FIG. 2 illustrates one embodiment of an optimized switching architecture that can be used to implement a content switch that reduces the packet processing overhead. The architecture illustrated in FIG. 2 is used in the Cisco Content Switching Module for the Catalyst 6500 Series switch and 7600 Internet router, for example.

The switching architecture shown in FIG. 2 provides dedicated processing resources to (1) control functions, such as out-of-band health checks; (2) connection management, such as server selection and session establishment; and (3) packet forwarding. This separation allows for improved performance of a content switch implemented using the pipelined architecture of FIG. 2.

In one embodiment, the techniques disclosed herein are performed by a content switch that has been implemented using pipelined architecture as shown in FIG. 2. While any type of SLB or content switch may be used, the pipelined architecture described herein provides for efficient deep-packet scanning capability that is advantageous for implementing the disclosed techniques.

As shown in FIG. 2, to content switch architecture consists of five field programmable gate arrays (FPGAs), denoted FPGA1 to FPGA5, and network processors (NPs), denoted NP1 to NP5, matched in pairs and structured as a dual pipeline. Traffic targeted to the content switch arrives via one or more connections. For example, the content switch may be configured to participate in and listen to a set of VLANs on a Cisco Catalyst 6500 backplane. In the embodiment shown in FIG. 2, four 1-Gbps, full-duplex connections 201 to the backplane are multiplexed together at multiplexer (MUX) 202 to provide a 4-Gbps, full-duplex data path to content switch processing.

Each network processor (NP1-NP5) has a connection via a PCI bus 241 to the control processor 240. The control processor is responsible for the configuration and management of all components on the content switch as well as for the processing associated with certain control tasks.

Once content switch processing begins, a packet matching configured policies traverses one of two paths through the content switch. The first path is a "connection-processing" pipeline, shown as lines 250, 251, 252, 253. The second is a "forwarding" pipeline, shown as line 260. These specific pipeline paths are discussed in more detail herein.

The pipelines consist of a series of linked stages, the "Session" stage 205, the "TCP" stage 210, the "L7" (Layer 7) stage 215, the "LB" (Load Balancing) stage 220, and the "NAT" stage 230. As shown, each stage consists of a FPGA and network processor pair. Memory may also be associated with each stage in order to store local information, such as states or status associated with the stage. As packets move through one of the pipelines, a specific set of operations is performed at each stage. The results of each pipeline stage are then passed along with the packet to the next stage that utilizes those results, the packet itself, and any state information it may maintain locally as inputs into its processing.

Each stage in the pipeline is responsible for determining the downstream stage that should receive the packet next. A stage may skip a downstream stage by inserting the address of a further downstream stage as the recipient of its output. The network processor at a skipped stage does not receive or process the packet. Hence, latency, bandwidth and overhead through the content switch are reduced as unnecessary processing steps are bypassed in hardware.

All packets move through the pipeline in the same direction, entering through the MUX from the backplane, and leaving through the MUX to the backplane. There are two stages in common for both pipelines: the Session stage 205 and the NAT stage 230. The Session stage 205 determines which pipeline path the packet will take.

FIG. 3A illustrates the connection processing pipeline portion of FIG. 2. FIG. 3B illustrates the forwarding pipeline portion of FIG. 2. The connection processing pipeline of FIG. 3A is used when new connections are established, existing connections are modified or completed connections are torn down. For example, connection processing may be used to detect new connections, lookup a virtual server, and select a real server based on load balancing, persistence, failover and other policy requirements.

The forwarding processing pipeline is used for processing associated with the forwarding of packets that are part of established connection. For example, the forwarding processing pipeline of FIG. 3B is used for packet classification (i.e. determine if packet is part of an existing connection), packet transformation (e.g. address changes, port changes, sequence number changes), and to queue and transmit a packet.

In the pipelined architecture shown in FIG. 2, the stages in forwarding processing (i.e. Session stage 205 and NAT stage 230) take place on every packet the content switch handles, so although forwarding processing is less complex than the processing associated with connection management and control, it happens more frequently. Connection processing is needed only for the start of connections, the end of connections, and modifications to connections. Packets associated with these events need to be handled differently than those packets that are merely parts of established connections. Once connections are established, associated packets may be "cut through" along the forwarding pipeline until some new connection-modifying event occurs. This results in much lower processing overhead in the system for the vast majority of packets that are simply forwarded in accordance with a configured policy.

The Session stage 205 determines whether a packet indicates the beginning of a connection, the end of a connection, or is part of an existing connection. Packets that are part of an existing connection need only be forwarded over the connection to the NAT stage 230 in the forwarding pipeline 260. A connection ID passed with the packet assists the module in the NAT stage 230 to quickly locate the correct session entry containing the appropriate packet transformations.

For a packet that is determined by the Session stage 205 to require connection processing, the Session stage 205 forwards the packet over the connection processing pipeline path 250 to TCP stage 210. TCP stage 210 is responsible for maintaining TCP session state for all connections. TCP stage 210 determines the beginning and end of connections, filters denial-of-service attacks, performs delayed binding if required, and forwards the packet on to either Layer 7 (L7) stage 215 or Load Balancing (LB) stage 220 as required. The Layer 7 stage can be bypassed for connections that only need processing at Layer 3 or Layer 4.

Significantly, the TCP stage 210 is capable of monitoring and analyzing feedback of any connection oriented Layer 4 protocols.

Packets are forwarded by TCP stage 210 to Layer 7 stage 215 if the Layer 3 and Layer 4 information obtained from the packet indicates that this packet needs to be matched against any Layer 7 policies. Layer 7 stage 215 may parse the packet for relevant fields (such as cookies and URLs) and may apply a regular expression match against them. Packets and results from Layer 7 stage 215 are passed to Load Balancing stage 220.

Significantly, the Layer 7 stage 215 is capable of extracting Layer 7 application data from a packet, and in particular, parsing application specific return values from packets.

The Load Balancing stage 220 receives packets from either the TCP stage 210 or the Layer 7 stage 215, and may also receive information regarding the virtual server match for these packets. Load Balancing stage 220 applies the configured load balancing algorithm, persistence policy, and/or failover policy to the packet to select a real server to process the packet. Load Balancing stage 220 forwards the packet and NAT transformation information to NAT stage 230.

Significantly, the Load Balancing stage keeps track of the various information about the real servers in a server cluster. In particular, the Load Balancing stage tracks which servers are in and out of service (i.e. which servers to consider in the load balancing server selection process).

The final stage in the connection processing pipeline or the forwarding pipeline is the NAT stage 230, which is responsible for applying all relevant packet transformations to the packets and sending them back to the MUX for transmission to the backplane.

2.3 Passive Server Health Monitoring

When a content switch is implemented using the pipelined architecture, server state information may be stored in memory associated with the Load Balancing stage. In one embodiment, the TCP stage and the Layer 7 stage each also store server state information in memory associated with each of these stages. Both the TCP stage and the Layer 7 stage can passively monitor traffic from a server back to a client, and indicate to the Load Balancing stage any detected anomalies or errors. If any of the flags or header fields in the return traffic indicate an anomaly or problem, or if the server fails to respond, then this information is passed to the Load Balancing stage. The Load Balancing stage may update server state information in its associated memory based on its determination of whether a server is healthy or not. The Load Balancing stage uses this stored server state information in its load balancing and server selection analysis.

For example, if the Session stage initially detects TCP errors in a packet, the Session stage will forward the traffic on to the TCP stage through the connection processing pipeline. As another example, if the Session stage detects HTTP return codes in a packet that match return codes configured in a policy, the Session stage will forward traffic on to the Layer 7 stage through the connection processing pipeline. Performance impact to other traffic going through the content switch is minimal as most other traffic is sent directly to the NAT stage through the forwarding pipeline. Only return traffic that indicates a problem will be processed through the connection processing pipeline.

In the pipelined architecture, TCP stage processing, Layer 7 stage processing and Load Balancing stage processing are all implemented in different processors. Since the data/control packets flow from the TCP stage to the Layer 7 stage to the Load Balancing stage, adding control formats that allow TCP or Layer 7 to inform the Load Balancing stage of a problem with a server does not add to packet processing overhead.

Return traffic can be passively monitored in any content switch or SLB that keeps track of the state of TCP connections, and an architecture such as the one shown in FIG. 2 is not required, and is used only as an example. If an SLB detects a TCP RST during client-server communication, the associated connection is torn down. Similarly, if a real server fails to respond to a TCP SYN within a certain period of time, the associated connection is torn down. This "abnormal end session" information (i.e. RST and no-response timeouts) used for session management can be used to passively monitor the health of a server in a server cluster. Once connections are established, stored connection information, such as session table entries, contain data that allows a SLB to determine a connection's associated real server. In the event that a connection is brought down abnormally (i.e. due to error), any SLB can typically determine the real server associated with the connection.

When a SLB includes a mechanism to store and track real server status, such as a server status table, the SLB can access the appropriate entry in the server status table and update it accordingly when an abnormal end session is detected. There are many ways for a SLB to track server status, and use of a real server status table is not required. For instance, server states may be tracked by a state machine stored in memory, or any other technique known to those skilled in the art.

When a SLB tracks the states of servers, there are a number of ways of using the tracked server states in the load balancing analysis. For example, once a TCP RST is detected, the SLB can immediately place the server in an "out of service" state, which effectively removes it from the server cluster such that no new requests are sent to that server, by updating the entry in a table for the server associated with the connection that received the RST. Likewise, if a connection times out because a SYN is not received in the timeout period, the server can be placed in an "out of service" state by the SLB.

A SLB makes these server state or "health" determinations using only information in server response traffic, without performing any type of active probe. Such passive health checks may be used alone, or in conjunction with out-of-band health probes. For instance, if health probes and in-band health monitoring are both configured for a particular server, both sets of checks may be required to keep a real server in service.

2.3.1 Intelligent Detection of Server Failure

Instead of automatically taking a real server out of service as soon as an abnormal end session is detected, the SLB can be configured to intelligently analyze return traffic to determine whether or not a server has truly failed and should be taken out of service, and to determine when a server is ready to be put back into service.

For example, the SLB can be configured to retry the server a certain number of times before taking it out of load balancing consideration (i.e. remove the server from the server cluster.) For example, one of the policies configured on a content switch may include a "number of failures threshold" setting that allows a configurable number of abnormal end sessions for a real server to occur before the switch sets the state of the real server as "out of service". Only when the number of abnormal end sessions passes the number of failures threshold is the real server then pulled out of service.

2.3.2 Sliding Time Window for Determining Server Health

A "retry time period" parameter or other configurable setting may be set such that the threshold number of failures must be exceeded within that time period before the server is taken out of the server cluster. The retry time period is used to ensure that a server is not taken out of service simply because it had random errors over time. For example, suppose the number of failures threshold is configured to be 5, and that the server has 5 errors due to traffic congestion over the period of a month. If there is no retry time period, the server will be taken out of service as the number of failures threshold has been reached. There may be nothing wrong with this server, and taking it out of service will unnecessarily cause a detrimental effect on the server cluster response time. However, if a retry time period is configured, the server will have to reach the number of failures threshold within a time window defined by the retry time period to be considered "unhealthy" and taken out of service.

In one embodiment, the number of failures threshold may be a number of consecutive failures. For example, a SLB may be configured to have a threshold number of consecutive failures within a time window defined by the configured retry time period. In this example, when a first failure occurs, a time window clock and a failure count are started. Each consecutive failure increases the failure count. As soon as any successful response is received, the clock is stopped, as the failures are no longer consecutive. However, if the failure count reaches the consecutive failures threshold before the time window clock expires (i.e. reaches the configured retry time period) or a successful response is received, the server may then be put into an "out of service" state.

Alternatively or in addition, a SLB can be configured to have a threshold number of total failures (whether consecutive or not) within a time window defined by the configured retry time period. In this case, the clock is not restarted when a successful response is received, and the total number of failures that occur within the time window are counted.

In either case, if the threshold is not exceeded before the time window clock expires, the clock start point "slides" from the first detected failure in the time window to the time the next failure was detected. The failure count is also adjusted to reflect the number of failures starting from the new start point.

Figure 5:
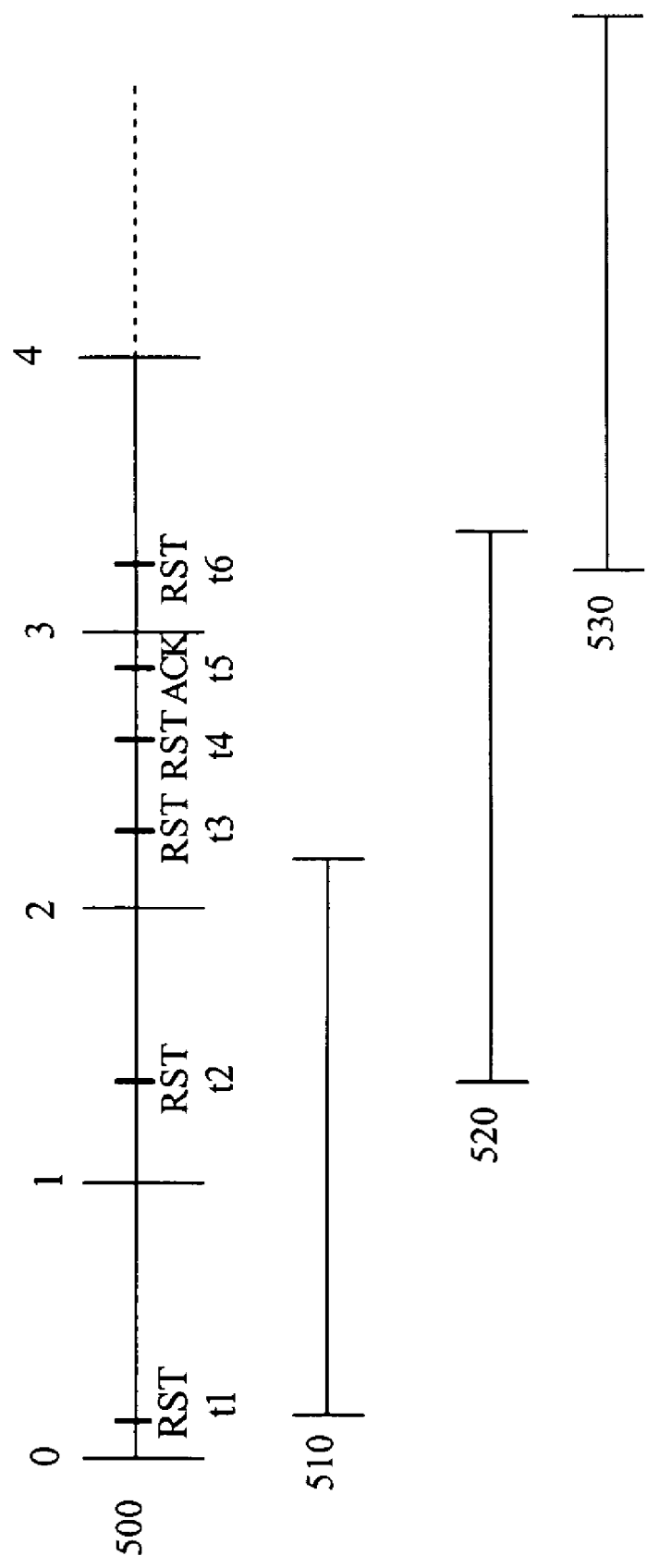
FIG. 5 illustrates a sliding time window used for monitoring the health of a server.

An example of the "sliding window" concept is illustrated in FIG. 5. In this example, a retry time period of 2 seconds is configured. First, suppose that a threshold for consecutive number of failures is set to 4. When the first failure is detected at time t1, the time window clock starts, as shown by time window 510. FIG. 5 illustrates a failure as a TCP RST, however, a timeout or HTTP return code may be used alternatively or in addition to detect failures.

In FIG. 5, another failure is detected at time t2. The 2-second time window clock 510 has not yet run out, so the consecutive number of failures within the time window is now 2. However, before the third failure is detected at time t3, the time window 510 expires. The time window now slides to begin at time t2, as shown by time window 520. The number of consecutive failures at this point is 1, as only one failure has been detected within this new time window—the failure at time t2.

At time t3, another failure is detected. As the current time window 520 has not yet expired, the number of consecutive failures at this point is incremented to 2. At time t4, another failure is detected, incrementing the number of consecutive failures to 3. However, at time t5, a successful response is detected, thereby breaking the string of consecutive failures. At this point there are no consecutive failures and the number of consecutive failures to re-set to zero. The time window does not start again until another failure is detected at time t6, as shown by time window 530.

However, consider a content switch having the policy of a threshold number of total failures configured to 4, again with a configured retry time period of 2 seconds. In this case, the time window again starts at time t1 with the first detected failure. Again, the time window 510 expires before the failure at time t3 is detected. However, in this case, the time window 520 will not end with the successful response at time t5. Therefore, the total number of failures will reach 4 at time t6, which is within the time window 520. While the time window ends with a successful response when a number of consecutive failures threshold is used, it does not end with a successful response when a number of total failures threshold is used.

Using a sliding time window, when a threshold number of failures (whether consecutive or total) occurs within the time window—no matter when this occurs—it can be detected. However, the threshold must be reached within the amount of time configured for the time window.

Figure 6:
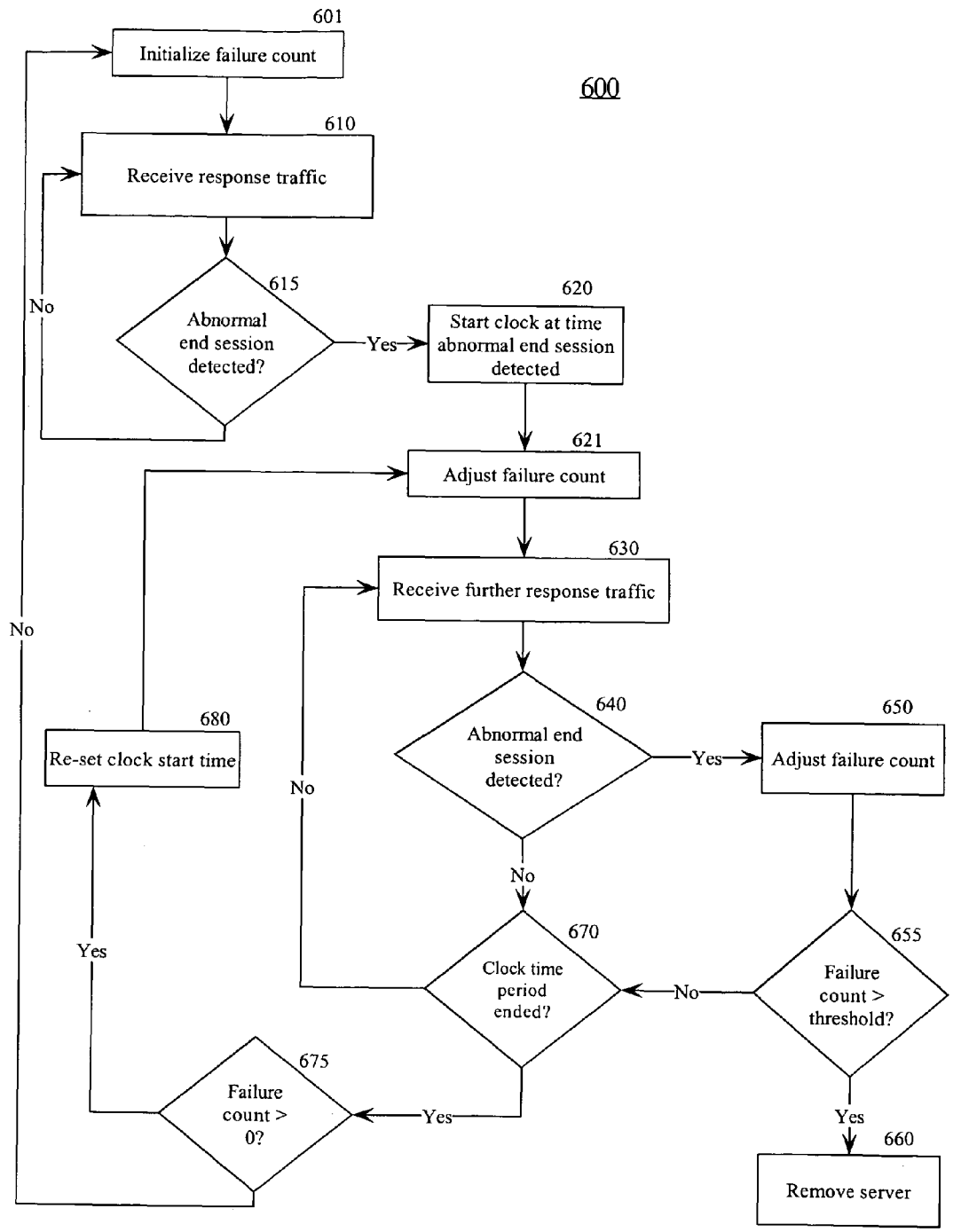
FIG. 6 is a flow diagram illustrating one embodiment for using a sliding time window for failure detection.

FIG. 6 is a flow diagram that illustrates a process 600 that a SLB can use to implement the sliding time window using a total number of failures threshold. As shown at step 601, the failure count is initialized. Typically, it will be initialized to zero. Response traffic from real servers is received by the SLB at step 610 until an abnormal end session is detected in step 615. At step 620, a clock is started at the time of the detection of the abnormal end session. The failure count is adjusted, typically incremented, at step 621. Further response traffic is received at step 630 while the clock times the configured retry response period.

If the return traffic is successful, then the process will continue through step 640 to step 670 until the retry time period tracked by the clock ends. If another abnormal end session is detected in the further response traffic at step 640, the failure count is adjusted, typically incremented, at step 650. For each detected abnormal end session detected, the adjusted failure count is compared to the threshold at step 655. If the threshold is ever exceeded during the retry time period tracked by the clock, the server is removed at step 660.

If the failure count does not exceed the threshold at any time before the clock that tracks the retry time period expires at step 670, in the embodiment shown in FIG. 6, the failure count is checked to see if the current time window still includes any failures. If there are no failures, then the process will re-start at step 601, in which the process will re-initialize and wait for a "new" first abnormal end session. If there are still any failures in the current time window, the clock will be re-started at the time of the next detected failure at step 680, thereby "sliding" the time window. The failure count is adjusted at step 621 to indicate the current number of failures in the new time window, typically decrementing the count.

The process shown in FIG. 6 is merely one technique for implementing a sliding time window for determining server health. Many variations are possible, and are intended to come within the scope of the present invention.

Another policy setting may include a "retry wait time" that sets a time period for the content switch to wait before re-introducing the failed real server into the server cluster. When a server has been disabled due to in-band health monitoring, this wait time setting ensures that the server is not re-tried until the wait time period has passed.

In one embodiment, once a server has been placed in a state that indicates that it is currently out of service due to exceeding a failure threshold setting, it requires a successful connection before the failure threshold parameter is considered again. For example, suppose a server has been placed in a state that indicates the number of abnormal end sessions has exceeded the failure threshold setting. Once the retry wait time has passed, the server may be placed back into load balancing consideration by the content switch. In one embodiment, if the server connection fails again, the server may be placed immediately into an out of service state without waiting for the number of failures indicated by the failure threshold setting.

2.3.3 Intermediate Error States

In one embodiment, the server state stored by a SLB may include only two states—"in service" and "out of service." In another embodiment, a server may be considered to be in one of a wide range of states. Use of many server states allows for a more granular use of server health in the load balancing analysis.

For example, when a configured retry wait period has passed for re-introducing a server back into a server cluster, the server can be placed in a "testing" state, in which a single client request is allowed to pass through to the server. If the client's SYN is responded to with a SYN-ACK in an appropriate time frame, then the server can be returned to normal operation, for example, by changing the server state to "in service." This allows for the case in which heavy network congestion is causing delays in server response, however the server itself is healthy. Once congestion has cleared, it is safe to put the server back in service.

As another example, if the SLB considers a server to have timed out (e.g. exceeds the failure threshold), it may change the server state to a "test 1 failed" state. If a response is received after the server state has been updated to "test 1 failed", a user can use a configuration knob to indicate whether that server response should be ignored (i.e. place server in an "out of service" state), or whether the late response should override the "test 1 failed" state such that the server is placed back into service immediately.

In one embodiment, when a server is in a "test 1 failed" state, no new connections are allowed to the server. A timer can be set for each server that is in a "test 1 failed" state. When the timer for a server expires, the server is then placed in a "test 2" state. When a server is in a "test 2" state, the SLB may allow traffic to pass to the server, but fewer error indicators, either consecutive or not, may be needed to remove the server from load balancing consideration again.

Figure 7:
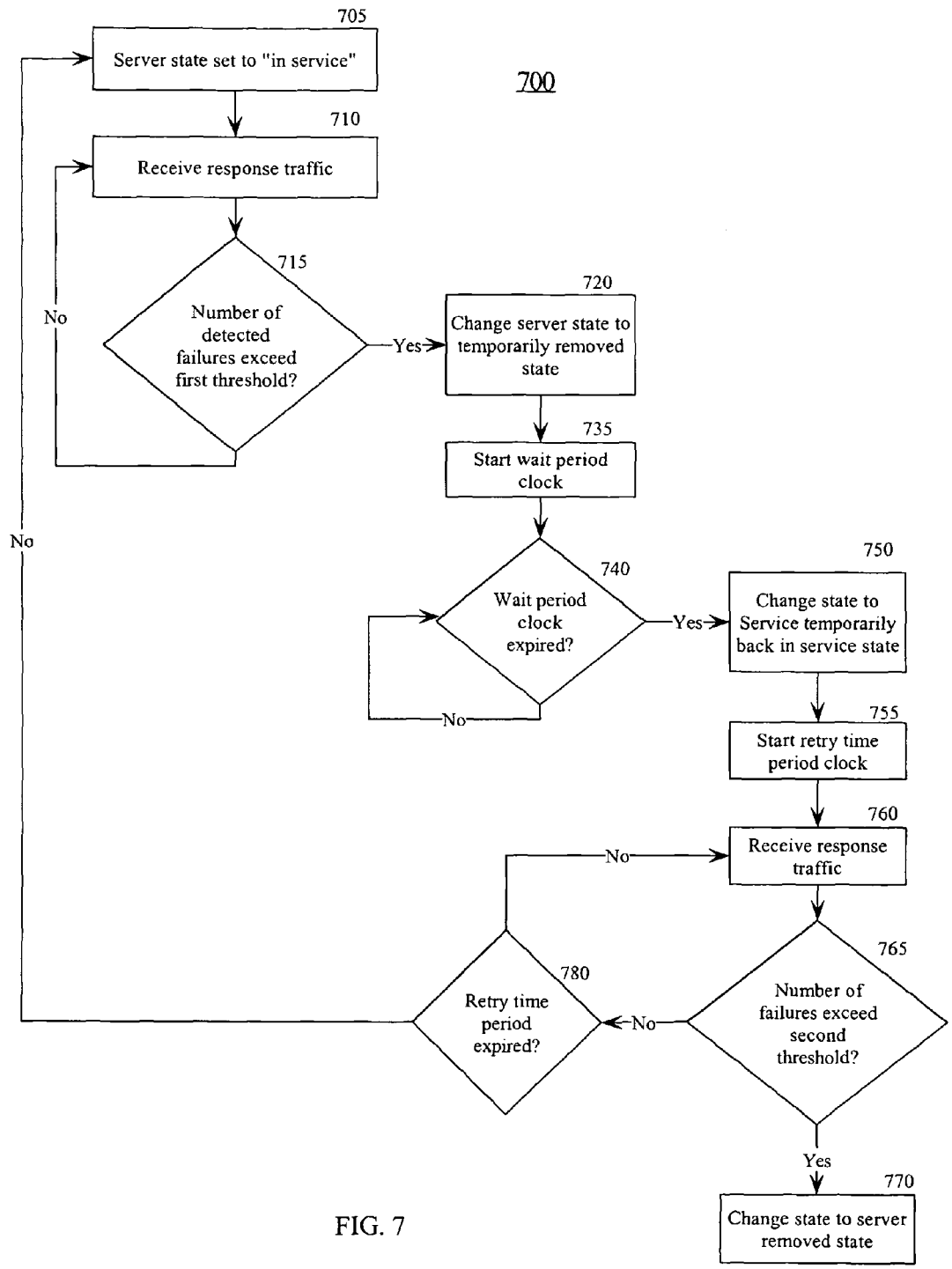
FIG. 7 is a flow diagram illustrating one embodiment for using intermediate error states to manage servers in a server cluster.

FIG. 7 illustrates one embodiment of a process 700 that uses intermediate error states for managing servers in a server cluster. At step 705, a server is initially considered to be in a normal, or "in service" state. Response traffic is received and processed at step 710. Any technique, such as the sliding time window technique of FIG. 6, may be used to determine when the number of detected failures exceeds a configured threshold at step 715. When the number of failures detected in the response traffic exceeds a configured threshold, the process continues to step 720.

The server is set to a state in which it is indicated to be temporarily out of service, e.g. a "test 1 failed" state, at step 720, and a wait period clock is started at step 735. Once the wait period is over, the state of the server is changed to a state that indicates that it is temporality back in service, e.g., a "test 2" state, at step 750. A retry period clock is started at step 755, and if a number of failures that exceeds a retry period threshold is detected at step 765, the server is changed to a failed state at step 770. If the retry period threshold is not exceeded during the retry period, the server is changed back to a normal state at step 705.

The process shown in FIG. 7 is merely one technique for implementing intermediate server states. Many variations are possible, and are intended to come within the scope of the present invention.

When a content switch is implemented using the pipelined architecture, the policy settings can be used by the TCP stage, Layer 7 stage and/or the Load Balancing stage to implement the above-described features. In one embodiment, the TCP stage and/or the Layer 7 stage may use the settings and information from return traffic to make the determination of whether to change the state of a server, and pass this determination on to the Load Balancing stage, which then places the server in or out of service according to the passed information. In another embodiment, the Load Balancing stage itself makes the determination whether to change a server's state according to configured settings and failure information passed by either the TCP or Layer 7 stages. As each of these stages has its own processing capabilities, the implementation of the above-described features can be done in a number of ways, with each stage performing a portion of the processing. Each stage has a module that can be configured to perform any of the necessary functions of parsing return traffic, analyzing the information and making server health determinations to implement the techniques described herein.

For example, the TCP stage may track the number of unsuccessful attempts to connect to a particular server. Once this number passes the threshold number of failures setting, the TCP stage can immediately information the Load Balancing stage that the server should be taken out of service. Likewise, the TCP stage can also keep track of the number of time the connection times out while waiting for SYN-ACKs.

2.3.3 HTTP Return Code Parsing

In addition to using TCP information in response traffic to monitor server health, application or Layer 7 information, such as HTTP return codes, may be examined to deduce server health to a finer-level of granularity. In one embodiment, return codes are configured in a policy on a content switch with associated thresholds. That is, a policy can be configured that specifies which return codes should be interpreted as failures, what actions to take upon receiving a specified return code, and associated thresholds and setting. For example, if a configured threshold of matching return codes are detected for a particular server, the server may be removed form service.

A server may be taken out of service permanently or for a configured amount of time before being reintroduced to the server cluster. Alternatively, HTTP return code parsing and monitoring may be used in conjunction with any of the sliding time window and/or intermediate error state features described above.

Typically, HTTP return codes that indicate server failure or impending server failure are detected and parsed from return traffic. For example, HTTP return code 505 (internal error) can be configured as a server failure return code. In one embodiment, all traffic from a server is monitored, and a server is taken out of service in accordance with configured thresholds and retry periods associated with particular HTTP return codes.

In one embodiment, return codes, actions and thresholds are configured for a particular server cluster. In a finer-grained embodiment, instead of monitoring return traffic and associating it with a single server, HTTP return code parsing allows for URL-based return code monitoring. In this embodiment, a URL map may be created that maps server farms with a URL. Using URL-based return code monitoring, a server can be configured to be taken out of service for only the set of content associated with a particular URL when a configured threshold is reached.

For example, suppose that Server A is part of a server cluster mapped to a particular URL. If a return code that indicates a server error for Server A when accessing the content of the URL, Server A can be taken out of service for just the content associated with the URL. In this example, Server A will still be available for other content. URL-based return code parsing allows a content switch to be more fine-grained about the responsive action taken.

Typically, URL-based configurations override basic return code configurations. For example, suppose in a server cluster that includes Server A and Server B, a total failure threshold of 5 is set for a HTTP 505 return code. A URL-based threshold of 10 is set for the same return code. Server A is mapped to the URL, and Server B is not mapped to the URL. After 5 return codes are returned from Server B, it is put into an "out of service" state. However, when 5 return codes are returned from Server A, it remains in service, as the configured threshold for the URL overrides the threshold for the server cluster.

3.0 Implementation Mechanisms—Hardware Overview

Figure 4:
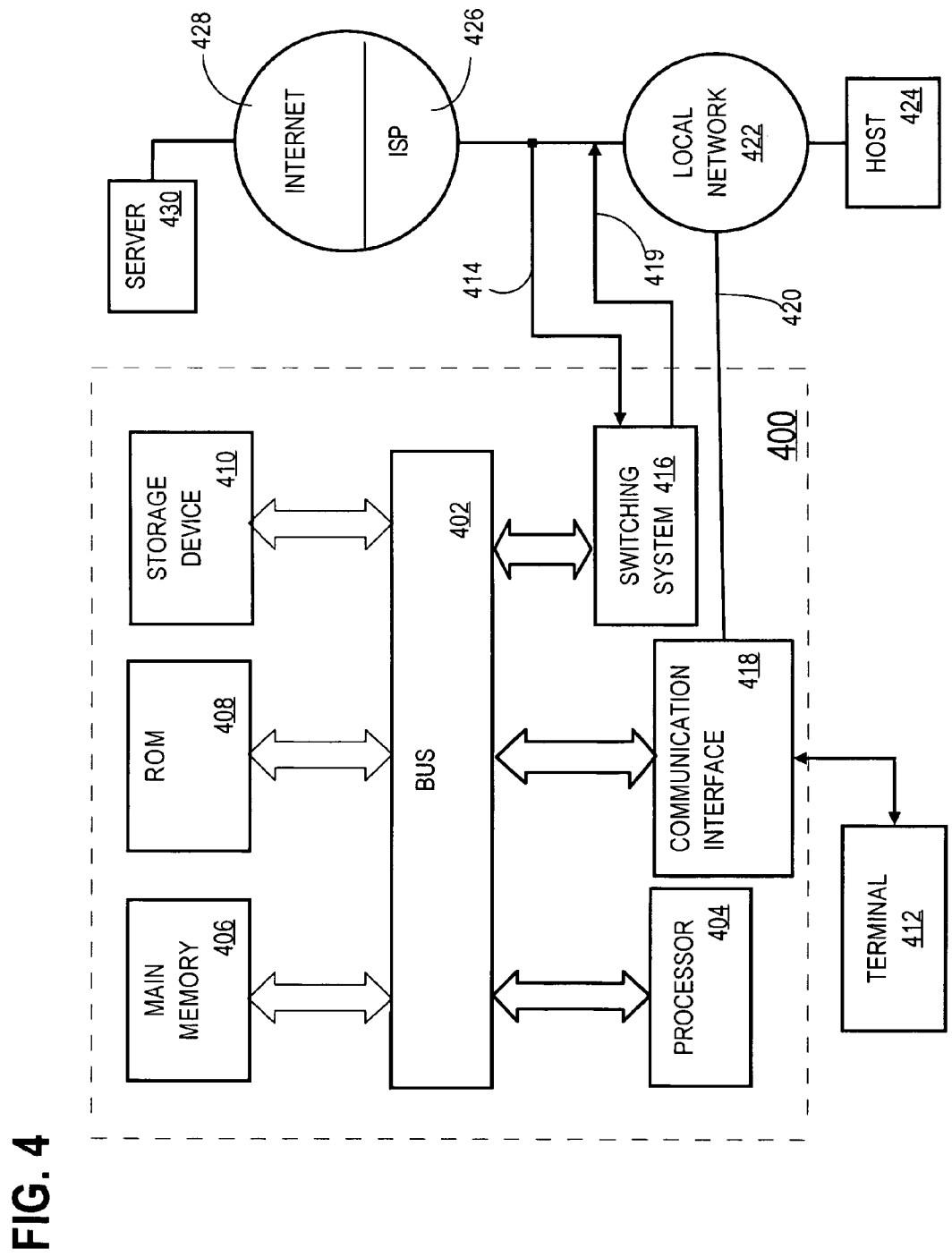
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for passively monitoring the health of a server through return traffic "snooping." According to one embodiment of the invention, passive server health monitoring is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for passive server health monitoring as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of passively monitoring servers in a server cluster comprising machine-implemented steps of:
   receiving request traffic that is sent from clients to the server cluster;
   routing the request traffic to a server in the server cluster;
   receiving response traffic from the server in the server cluster;
   wherein the response traffic is returned from the server to the clients, the response traffic corresponding to the request traffic;
   detecting, within a configured retry time period, whether a number of abnormal end sessions in the response traffic exceeds a first configured failure threshold;
   wherein the response traffic includes packets from all of a plurality of connections between the clients and the server;
   wherein the number of abnormal end sessions in the response traffic is determined across all of the plurality of connections between the clients and the server;
   in response to detecting, within the configured retry time period, that the number of abnormal end sessions in the response traffic exceeds the first configured failure threshold, performing the steps of:
      changing a state of the server to a first state that indicates that the server is at least temporarily removed from the server cluster, and
      starting a first state time clock;
   sending the response traffic to the clients;
   when the first state time clock expires, changing the state of the server to a second state that indicates that the server is included in the server cluster;
   receiving further response traffic from the server in the server cluster;
   wherein the further response traffic corresponds to further request traffic that was sent from the clients to the server cluster;
   detecting, within the configured retry time period, whether a number of abnormal end sessions in the further response traffic exceeds a second configured failure threshold;
   wherein the further response traffic includes packets from all of the plurality of connections between the clients and the server;
   wherein the number of abnormal end sessions in the further response traffic is determined across all of the plurality of connections between the clients and the server;
   in response to detecting, within the configured retry time period, that the number of abnormal end sessions in the further response traffic exceeds the second configured failure threshold, changing the state of the server to a third state that indicates that the server is removed from the server cluster;
   wherein said second configured failure threshold is less than said first configured failure threshold;
   sending the further response traffic to the clients;
   wherein the method is performed by one or more network devices.

2. The method as recited in claim 1, wherein the first state is the same as the third state.

3. The method as recited in claim 1, wherein the first configured failure threshold is a number of total failures threshold.

4. The method as recited in claim 1, wherein the first configured failure threshold is a number of consecutive failures threshold.

5. The method as recited in claim 1, wherein the response traffic includes TCP header information, and detecting an abnormal end session comprises detecting a TCP RST in the response traffic.

6. The method as recited in claim 1, wherein the response traffic includes TCP header information, and detecting an abnormal end session comprises not receiving a TCP ACK in the response traffic within a timeout period.

7. The method as recited in claim 1, wherein the response traffic includes HTTP return codes, and detecting an abnormal end session comprises detecting a HTTP return code in the response traffic matching a configured return code.

8. An apparatus operable to passively monitor servers in a server cluster, the apparatus comprising:
   one or more processors;
   a network interface communicatively coupled to the one or more processors and configured to communicate one or more packet flows among the one or more processors in a network; and
   a computer readable medium comprising one or more sequences of instructions which, when executed by the one or more processors, cause the one or more processors to perform the steps of:
      receiving request traffic that is sent from clients to the server cluster;
      routing the request traffic to a server in the server cluster;
      receiving response traffic from the server in the server cluster;
      wherein the response traffic is returned from the server to the clients, the response traffic corresponding to the request traffic;
      detecting, within a configured retry time period, whether a number of abnormal end sessions in the response traffic exceeds a first configured failure threshold;
      wherein the response traffic includes packets from all of a plurality of connections between the clients and the server;
      wherein the number of abnormal end sessions in the response traffic is determined across all of the plurality of connections between the clients and the server;
      in response to detecting, within the configured retry time period, that the number of abnormal end sessions in the response traffic exceeds the first configured failure threshold, performing the steps of:

changing a state of the server to a first state that indicates that the server is at least temporarily removed from the server cluster, and
starting a first state time clock;
sending the response traffic to the clients;
when the first state time clock expires, changing the state of the server to a second state that indicates that the server is included in the server cluster;
receiving further response traffic from the server in the server cluster;
wherein the further response traffic corresponds to further request traffic that was sent from the clients to the server cluster;
detecting, within the configured retry time period, whether a number of abnormal end sessions in the further response traffic exceeds a second configured failure threshold;
wherein the further response traffic includes packets from all of the plurality of connections between the clients and the server;
wherein the number of abnormal end sessions in the further response traffic is determined across all of the plurality of connections between the clients and the server;
in response to detecting, within the configured retry time period, that the number of abnormal end sessions in the further response traffic exceeds the second configured failure threshold, changing the state of the server to a third state that indicates that the server is removed from the server cluster;
wherein said second configured failure threshold is less than said first configured failure threshold;
sending the further response traffic to the clients.

9. The apparatus of claim 8, wherein:
the response traffic includes TCP header information; and
the instructions that cause the one or more processors to perform the step of detecting the number of abnormal end sessions comprise instructions which, when executed by the one or more processors, cause the one or more processors to perform one or more of the steps of:
detecting a TCP RST in the response traffic; and
detecting that a TCP ACK is not received in the response traffic within a timeout period.

10. The apparatus of claim 8, wherein the response traffic includes HTTP return codes, and wherein the instructions that cause the one or more processors to perform the step of detecting the number of abnormal end sessions comprise instructions which, when executed by the one or more processors, cause the one or more processors to perform the step of detecting a HTTP return code in the response traffic matching a configured return code.

11. The apparatus of claim 8, wherein the first state is the same as the third state.

12. The apparatus of claim 8, wherein the first configured failure threshold is a number of total failures threshold.

13. The apparatus of claim 8, wherein the first configured failure threshold is a number of consecutive failures threshold.

14. A non-transitory computer-readable medium storing one or more sequences of instructions for passively monitoring servers in a server cluster, which instructions, when executed by one or more processors, cause the one or more processors to perform the steps of:
receiving request traffic that is sent from clients to the server cluster;
routing the request traffic to a server in the server cluster;
receiving response traffic from the server in the server cluster;
wherein the response traffic is returned from the server to the clients, the response traffic corresponding to the request traffic;
detecting, within a configured retry time period, whether a number of abnormal end sessions in the response traffic exceeds a first configured failure threshold;
wherein the response traffic includes packets from all of a plurality of connections between the clients and the server;
wherein the number of abnormal end sessions in the response traffic is determined across all of the plurality of connections between the clients and the server;
in response to detecting, within the configured retry time period, that the number of abnormal end sessions in the response traffic exceeds the first configured failure threshold, performing the steps of:
changing a state of the server to a first state that indicates that the server is at least temporarily removed from the server cluster, and
starting a first state time clock;
sending the response traffic to the clients;
when the first state time clock expires, changing the state of the server to a second state that indicates that the server is included in the server cluster;
receiving further response traffic from a server in the server cluster;
wherein the further response traffic corresponds to further request traffic that was sent from the clients to the server cluster;
detecting, within the configured retry time period, whether a number of abnormal end sessions in the further response traffic exceeds a second configured failure threshold;
wherein the further response traffic includes packets from all of the plurality of connections between the clients and the server;
wherein the number of abnormal end sessions in the further response traffic is determined across all of the plurality of connections between the clients and the server;
in response to detecting, within the configured retry time period, that the number of abnormal end sessions in the further response traffic exceeds the second configured failure threshold, changing the state of the server to a third state that indicates that the server is removed from the server cluster;
wherein said second configured failure threshold is less than said first configured failure threshold;
sending the further response traffic to the clients.

15. The non-transitory computer-readable medium of claim 14, wherein the first state is the same as the third state.

16. The non-transitory computer-readable medium of claim 14, wherein the first configured failure threshold is a number of total failures threshold.

17. The non-transitory computer-readable medium of claim 14, wherein the first configured failure threshold is a number of consecutive failures threshold.

18. The non-transitory computer-readable medium of claim 14, wherein the response traffic includes TCP header information, and the instructions that cause the one or more processors to perform the step of detecting the number of abnormal end sessions comprise instructions which, when executed by the one or more processors, cause the one or more processors to perform the step of detecting a TCP RST in the response traffic.

19. The non-transitory computer-readable medium of claim 14, wherein the response traffic includes TCP header information, and the instructions that cause the one or more processors to perform the step of detecting the number of abnormal end sessions comprise instructions which, when executed by the one or more processors, cause the one or more processors to perform the step of detecting that a TCP ACK is not received in the response traffic within a timeout period.

20. The non-transitory computer-readable medium of claim 14, wherein the response traffic includes HTTP return codes, and wherein the instructions that cause the one or more processors to perform the step of detecting the number of abnormal end sessions comprise instructions which, when executed by the one or more processors, cause the one or more processors to perform the step of detecting a HTTP return code in the response traffic matching a configured return code.

* * * * *